(No Model.) 2 Sheets—Sheet 1.
H. T. CARRINGTON.
LOCOMOTIVE ASH PAN SCRAPER.
No. 473,692. Patented Apr. 26, 1892.
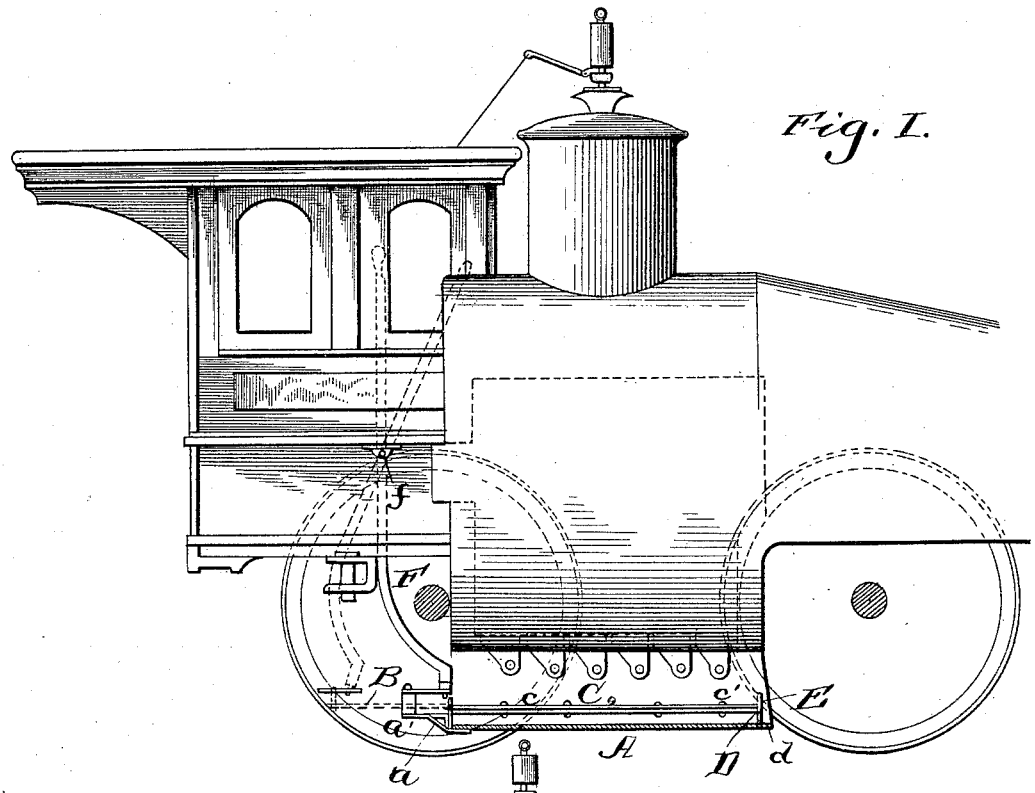
Fig. I.
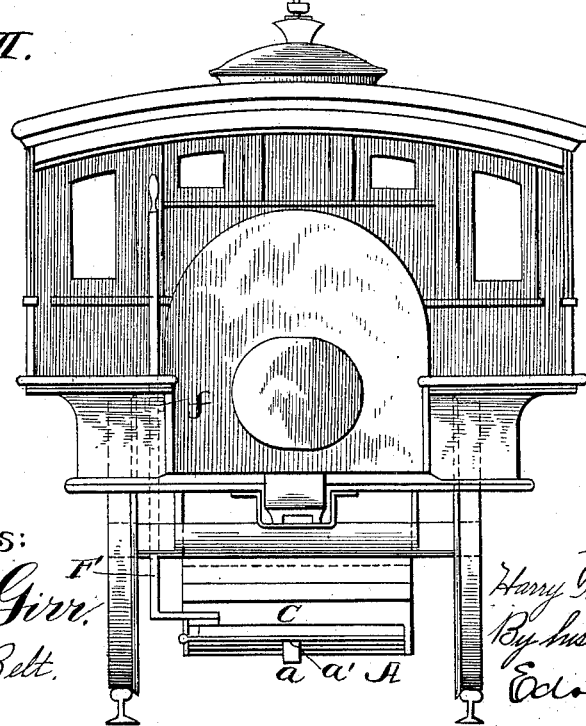
Fig. II.
Witnesses:
J. B. McGivr.
William O. Belt.
Inventor:
Harry Thornton Carrington,
By his Attorneys
Edoub Bros.

(No Model.) 2 Sheets—Sheet 2.
H. T. CARRINGTON.
LOCOMOTIVE ASH PAN SCRAPER.
No. 473,692. Patented Apr. 26, 1892.
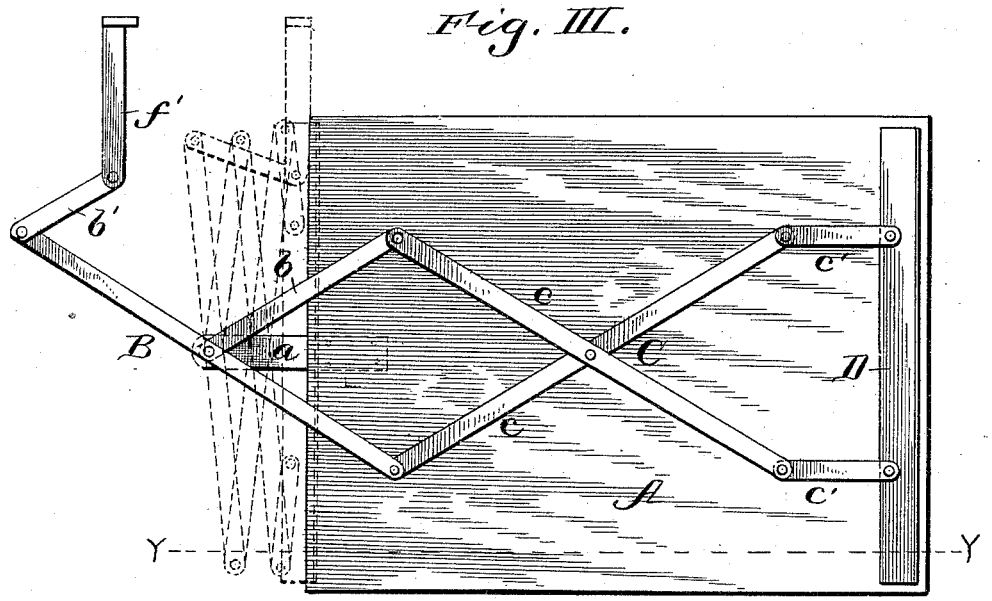
Fig. III.
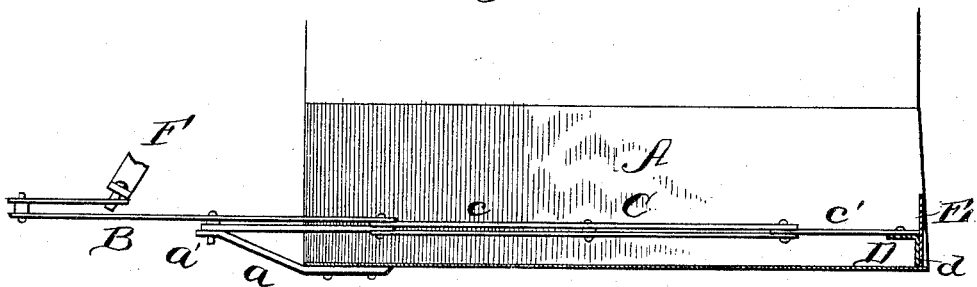
Fig. IV.
Witnesses:
J. B. McGinn.
William O. Belt
Inventor.
Harry Thornton Carrington
By his Attorneys
Edson Bro's.

United States Patent Office.

HARRY THORNTON CARRINGTON, OF BIRMINGHAM, ALABAMA, ASSIGNOR TO HENRY G. STERNE AND MORRIS KARGER, OF SAME PLACE.

LOCOMOTIVE-ASH-PAN SCRAPER.

SPECIFICATION forming part of Letters Patent No. 473,692, dated April 26, 1892.

Application filed June 11, 1891. Renewed March 21, 1892. Serial No. 425,654. (No model.)

*To all whom it may concern:*

Be it known that I, HARRY THORNTON CARRINGTON, a citizen of the United States, residing at Birmingham, in the county of Jefferson and State of Alabama, have invented certain new and useful Improvements in Locomotive-Ash-Pan Scrapers; and I do hereby declare the following to be a full, clear, and exact description of the invention, such as will enable others skilled in the art to which it appertains to make and use the same.

My invention relates to improvements in scrapers for locomotive ash-pans; and the objects are to provide an improved simple device for scraping ashes from the ash-pan of a locomotive, which device can be compactly folded at one end of the pan when not in use, and which can be readily and quickly operated from the cab of a locomotive to thoroughly clean the pan.

With these and other ends in view my invention consists of a series of links pivotally connected together to form the lazy-tongs, which are pivotally secured in the rear of the ash-pan and are adapted to be compactly folded behind the same. A scraper is fastened on the front links of the tongs, and a vertical lever extending into the cab of the locomotive is secured by an intermediate link to the lazy-tongs and is adapted to extend and contract the tongs. As the lever is operated, the tongs are extended and the scraper pushes the ashes in the ash-pan out of one end thereof, and when the tongs are closed or contracted the scraper gathers any ashes remaining in the pan and forces them out of the opposite end of the pan.

My invention further consists of certain details of construction and arrangement of parts, as will more fully appear hereinafter.

To enable others to more readily understand my invention, I have illustrated the same in the accompanying drawings, in which—

Figure I is a side elevation, partly in section, of the rear portion of a locomotive with the ash-pan scraper attached thereto. Fig. II is a rear end elevation of a locomotive, partly in section, with my improved scraper in position behind the ash-pan. Fig. III is an enlarged top plan view of an ash-pan with the scraper attached thereto and shown extended in full lines and folded in rear of the ash-pan in dotted lines; and Fig. IV is a sectional elevation of the ash-pan with the scraper attached thereto, taken longitudinally through the same on the line Y Y of Fig. III.

Referring to the drawings, in which like letters of reference denote corresponding parts in all the figures, A designates the ash-pan of a locomotive, and in the rear end thereof, at or about the center, a bracket or support $a$ is riveted or otherwise secured to the bottom of said pan. This bracket or support projects upwardly above the bottom of the ash-pan and it extends a short distance in rear thereof and is provided with a flat bearing $a'$ at its extreme end. A lever B is pivotally secured on this bearing-surface $a'$, and its ends extend an equal distance on each side thereof. The lazy-tongs C are pivotally secured to this lever and its pivotal point $a'$, said lazy-tongs consisting, preferably, of the two main links $c$, crossing each other and pivoted at their centers, and the short links $c'$, loosely secured on the front ends of the long links $c$. One of these main links $c$ has its rear end pivotally secured to one end of the lever B, and the rear end of the other main link is loosely connected to the lever B at its pivotal point $a'$ by a link $b$, which is equal in length to one-half of said lever B. Thus the lazy-tongs are pivotally supported on a bracket projecting in rear of the ash-pan and they are arranged a short distance above said pan to operate freely therein. The free ends of the short links $c'$ are pivotally secured to a reinforce D, consisting of an angle-iron, and the downwardly-extending lip $d$ of this reinforce is arranged to rest on the bottom of the ash-pan and form a bearing for the front portion of the lazy-tongs, the height of the lip $d$ being equal to the distance of the pivotal point $a'$ above the horizontal plane of the ash-pan bottom. A scraper E is securely fastened to the front of the reinforce by rivets or otherwise, and its lower edge rests on the bottom of the ash-pan to push or scrape the dirt and ashes thereon as the tongs are extended and closed.

An upright hand-lever F is arranged on one side of the locomotive-cab and it is fulcrumed in a bearing or bracket $f$ at a convenient place in the cab. The lower end of this lever has an angular projection or foot $f'$, which extends over and in rear of the ash-pan, and the end of this foot is pivotally connected to the rear end of the lazy-tongs lever B by a short link $b'$. By means of this lever and its connection with the lazy-tongs the scraper can be quickly and easily operated to move back or forth over the ash-pan and remove the ashes therefrom. Ordinarily it will only be necessary to operate the lever once, as the forward movement of the scraper will push almost all of the ashes out of the front end of the ash-pan, and as the tongs are contracted and closed the scraper in its rearward movement will draw with it all the ashes remaining in the pan which have not been removed during the forward movement of the scraper. The bracket or support $a$ extends in rear of the ash-pan a sufficient distance to allow the lazy-tongs when folded and closed to lie behind the pan, and the scraper then operates to close the rear end of the ash-pan and is always in position to be projected to push the ashes out of said pan. When the tongs are closed by a rearward movement of the hand-lever F, the links are folded together, and the lever B assumes a position across the bracket $a$, and the short connecting-link $b'$ extends over the tongs to allow the foot $f'$ on the hand-lever to lie against the rear end of the ash-pan.

I am aware that changes in the form and proportion of parts and details of construction can be made without departing from the spirit or sacrificing the advantages of my invention, and I therefore reserve the right to make such changes as fall within the scope of my invention; but in the practical construction of these improvements I prefer to construct the scraper of light sheet-iron of sufficient stiffness to operate properly, and the lazy-tongs and other parts may be constructed of any suitable iron.

Having thus fully described my invention, what I claim as new, and desire to secure by Letters Patent, is—

1. In a locomotive-ash-pan scraper, the lazy-tongs pivotally secured on the ash-pan and carrying a scraper at the forward end, adapted to be moved over the pan and push the ashes therefrom, substantially as described.

2. In a locomotive-ash-pan scraper, the combination of the lazy-tongs pivotally secured in rear of the pan, a scraper secured on the front of said tongs, and a hand-lever pivotally connected to said tongs to operate the same, substantially as described.

3. In a locomotive-ash-pan scraper, a bracket secured on the rear end of the pan and projecting therefrom, the lazy-tongs pivotally secured to said bracket, the scraper carried by the tongs, and the lever adapted to operate the lazy-tongs and the scraper, substantially as described.

4. In a locomotive-ash-pan scraper, a bracket secured on the rear end of the pan and projecting therefrom, the lever carrying the lazy-tongs, pivotally secured to said bracket, the reinforce secured to the front ends of the tongs, and the scraper carried by the reinforce on the tongs, substantially as described.

5. In a locomotive-ash-pan scraper, the lazy-tongs pivotally secured in rear of the pan, the scraper secured on the front ends of said tongs, and the vertical hand-lever fulcrumed in a bracket in the locomotive-cab and having an angular projection connected with the tongs, substantially as described.

6. In a locomotive-ash-pan scraper, the upwardly-projecting bracket secured on the rear end of the ash-pan, the lever fulcrumed on said bracket, the lazy-tongs pivotally connected to said lever, the reinforce secured on the front ends of the tongs, the scraper attached to said reinforce, and the hand-lever having the angular projection pivotally connected with said lever and adapted to operate the scraper, substantially as described.

In testimony whereof I affix my signature in presence of two witnesses.

HARRY THORNTON CARRINGTON.

Witnesses:
JOHN VARY,
T. L. GILMER.